United States Patent [19]
Schwartz et al.

[11] Patent Number: 5,361,176
[45] Date of Patent: Nov. 1, 1994

[54] INDEX PULSE GENERATION IN A DATA STORAGE TAPE DRIVE

[75] Inventors: Jeffrey D. Schwartz, Loveland; Mark E. Nash, Lyons, both of Colo.

[73] Assignee: Hewlett-Packard Company, Palo Alto, Calif.

[21] Appl. No.: 41,080

[22] Filed: Apr. 1, 1993

[51] Int. Cl.⁵ .............................................. G11B 5/09
[52] U.S. Cl. ......................................... 360/46; 360/50
[58] Field of Search .................... 360/46, 48, 49, 50, 360/72.1, 69

[56] References Cited
U.S. PATENT DOCUMENTS
4,541,019  9/1985  Precourt ............................... 360/15

Primary Examiner—Donald Hajec
Assistant Examiner—Won Tae C. Kim
Attorney, Agent, or Firm—Augustus W. Winfield

[57] ABSTRACT

An apparatus and method for generating an index pulse by a data storage tape drive. The tape drive is controlled by a flexible disk controller. A multi-track tape is formatted into multiple data segments per track with erased areas between segments. A digital data signal from the tape signal processor is sampled to detect a lapse in data. Then, the analog data signal is continuously monitored to detect the reappearance of data. When filtered analog signal peaks exceed a fixed threshold, a pulse is generated from the tape drive to the flexible disk controller. In an alternative embodiment, to further protect against false triggering, index pulse generation is suppressed during most of each erased area between segments. In another embodiment, index pulse generation is suppressed if an erased area exceeds a length threshold, such as at the end of the tape. In still another embodiment, index pulse generation is suppressed if digital data reappears without triggering the analog monitoring circuit.

14 Claims, 8 Drawing Sheets

INDEX PULSE GENERATION IN A DATA STORAGE TAPE DRIVE

FIELD OF INVENTION

This invention relates generally to data storage devices such as magnetic tape drives and more specifically to generation of a signal required by electronic controllers for data storage devices.

BACKGROUND OF THE INVENTION

Computers compatible with the IBM/PC-AT computer typically have one or more flexible disk drives being controlled by a flexible disk controller circuit. It is common to also have a tape back-up device being controlled by the flexible disk controller. To the computer hardware and software, these tape devices appear to be flexible disk drives with a very large data capacity. To make this electronic compatibility possible, these tape drives must produce certain signals required by the flexible disk controllers. In particular, one signal required by some flexible disk controllers is a pulse which occurs once per revolution of a flexible disk.

5.25 inch flexible disks have a punched hole in the disk called an index hole. This hole is sensed by an optical sensor in the flexible disk drive. As the disk spins, each time the index hole is sensed a pulse (called an INDEX PULSE) is sent from the drive to the flexible disk controller. 3.5 inch flexible disks do not have a punched index hole but the drives generate an INDEX PULSE once each revolution of the disk.

Flexible disks are formatted in concentric tracks, each track being formatted into sectors. When a flexible disk is formatted by a flexible disk drive, each INDEX PULSE from the drive initiates formatting of a track by the controller. When reading a disk, the controller uses the INDEX PULSE as a signal to indicate the beginning of a track. In addition, the INDEX PULSE signal is used for timing cues by the controller and may also be used by the controller for other purposes when interacting with the host computer.

Tapes formatted for use with flexible disk controllers have longitudinal tracks which may be hundreds of feet long. Such tapes typically have tracks which are formatted into blocks of sectors called segments. The tape drives create an INDEX PULSE at the beginning of each segment so that to the controller, tape segments appear to be functionally equivalent to flexible disk tracks. During formatting, tape drives may generate INDEX PULSES by counting motor tachometer pulses which directly correlate to distance. However, after a tape is interchanged between drives or is rewritten with motor speed variations, tachometer pulses or tape motor revolutions will not correspond to segments. Therefore, when reading or writing data, tape drives typically monitor the magnetic data signals from the tape and generate INDEX PULSES based on those data signals.

Formatted sectors for both flexible disks and tapes contain certain sector fields (for example, sector identification numbers) which are written once when the medium is formatted and are never rewritten. Formatted sectors also have other fields such as data fields which are rewritten each time the data is changed. Rewritten fields always have a fixed number of bytes and are written at a fixed clock frequency (time between adjacent transitions may vary but the overall clock rate is constant). However, tape velocity may vary so that the physical length of a rewritten field depends on tape velocity. To accommodate physical length differences, the formatted fields which are subject to rewriting are separated from other areas by formatted spacer areas called gaps. Gaps are formatted with digitally encoded patterns but the gaps do not contain information. They are used as spacers between areas of information. Each formatted tape segment starts with a gap pattern. In addition, there are spaces between tape segments which are erased.

For an example of a standard tape format which is compatible with flexible disk controllers, see the QIC-80 Development Standard entitled Flexible-Disk-Controller-Compatible Recording Format For Information Interchange, available from Quarter-Inch Cartridge Drive Standards, Inc., 311 East Carrillo Street, Santa Barbara, Calif. 93101. For an example of an interface signal specification which includes specifications for the INDEX PULSE, see the QIC-117 Development Standard entitled Common Command Set Interface Specification For Flexible Disk Controller Based Minicartridge Tape Drives, also available from Quarter-Inch Cartridge Drive Standards, Inc.

Tape drives typically periodically monitor a counter to determine if an erased area is present. For example, in a typical drive, the drive processor is periodically interrupted by a tachometer signal from the motor control circuitry. The period of the tachometer signal is proportional to distance on the tape. An external counter counts digital encoded data pulses being read from the tape. When the interrupt is serviced, the counter is read and then cleared. If the data count is zero for several samples, the drive assumes the head is in an erased space between segments. Then, if a non-zero data count is detected after an assumed erased space, an INDEX PULSE is generated. Since the index generation is based on sampling a counter at discrete periodic sample times, the INDEX PULSE is generated with a variable distance relative to the beginning of a segment. This method is adequate for low bit densities. However, depending on the counter sampling rate, for higher bit densities such a method may generate an INDEX PULSE after sector information begins. This creates an error in the controller. Some solutions to that problem result in occasional segments without any INDEX PULSE. Therefore, a better method of generating an INDEX PULSE is needed which continuously monitors the data signal so that an INDEX PULSE can be generated precisely at the beginning of every segment and before any data.

In addition, noise between segments or at the end of the tape may trigger a false INDEX PULSE. There is a need to mask out noise so that INDEX PULSES are only generated by the beginning of valid data signals.

SUMMARY OF THE INVENTION

The present invention provides an apparatus and method for generating an INDEX PULSE precisely at the beginning of every segment for a tape drive. In addition, the present invention reduces the effects of noise by suppressing generation of an INDEX PULSE outside a narrow window of tape movement distance before and after the possible beginning of a segment. INDEX PULSES are generated in a multi-state process. First, digital encoded data pulses are monitored to detect the beginning of an erased area between segments. Second, a distance measurement counter is started to suppress generation of an INDEX PULSE until the head is near the end of the erased area. Third, the analog data signal is continuously monitored near the end of the erased area to detect the beginning of a segment. When the beginning of data is detected an INDEX PULSE is immediately generated. A distance measurement counter is used to detect an erased area that is at the end of the tape rather than between sectors. If the tape is at the end of the tape, the effect of noise is again reduced by suppressing generation of an INDEX PULSE. Finally, generation of an INDEX PULSE is suppressed if digital data restarts without being detected by the analog data monitoring circuitry.

DETAILED DESCRIPTION OF THE PREFERRED EMBODIMENT OF THE INVENTION

Figure 1:
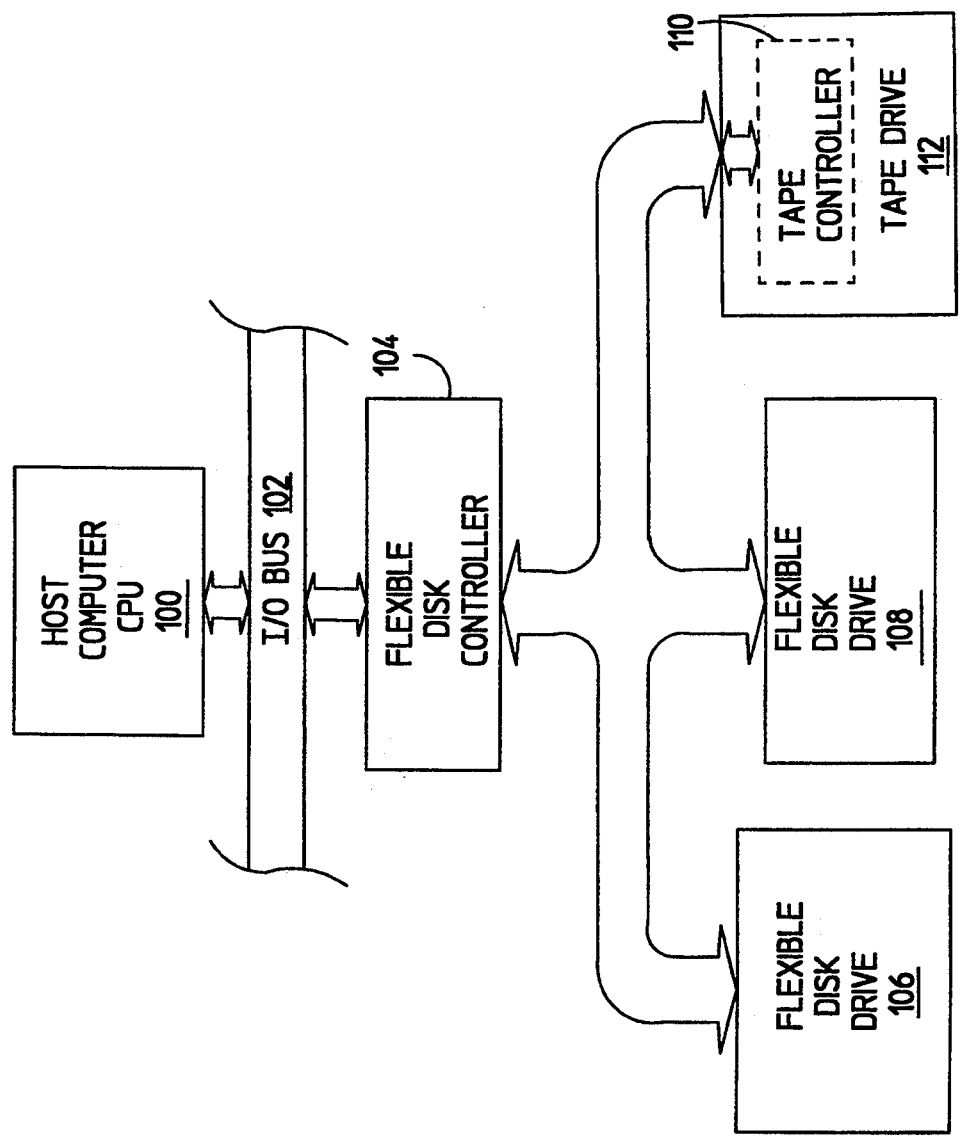
FIG. 1 is a block diagram schematic of a computer system incorporating the present invention.

FIG. 1 illustrates a computer system having a central processing unit (CPU) 100 connected to an input/output (I/O) bus 102. The I/O bus 102 provides bidirectional data communication between the CPU 100 and input/output (I/O) controllers such as a flexible disk controller 104. The flexible disk controller 104 may control multiple flexible disk drives (106 and 108) and in particular for this invention controls one or more compatible tape drives such as tape drive 112. The tape drive 112 includes a tape controller 110 for tape specific functions such as motor control and end of tape detection. The present invention is concerned with generation of a signal from the tape drive controller 110 to the flexible disk drive controller 104.

Figure 2:
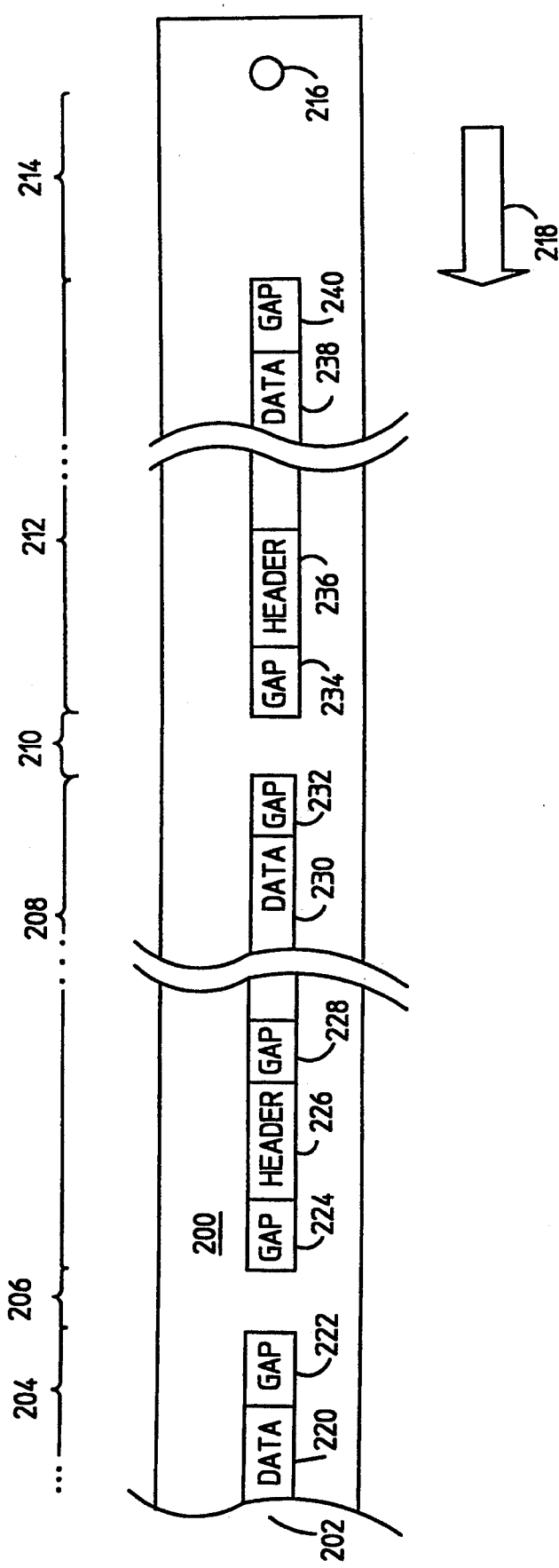
FIG. 2 is a top view of a portion of the surface of a tape illustrating a formatted track.

FIG. 2 illustrates a portion of a tape 200 formatted into multiple tracks. Only one track 202 is illustrated. The width of track 202 is exaggerated relative to the width of tape 200 for ease of illustration. Tapes compatible with flexible disk controllers typically have up to 44 such tracks. Track 202 is formatted into segments (204, 208 and 212) which are separated by DC erased gaps (206 and 210). Segments are further formatted into sectors (not illustrated). There is also a long erased area 214 between the end of the last segment of a track and a physical end of tape marker (punched hole 216). For track 202, tape motion past a stationary head is in the direction of the arrow 218.

In FIG. 2, the last sector of segment 204 ends with a data field 220 followed by a gap 222. The first area of segment 208 has a gap 224 followed by a segment header 226 followed by a gap 228 followed by multiple sectors (not illustrated). The last sector of segment 208 ends with a data field 230 and a gap 232. Gaps 222, 224, 228 and 232 are formatted with digitally encoded patterns whereas the gaps between segments (206 and 210) are DC erased. The distinction is important because formatted gap areas produce a signal at the head whereas the DC erased gap areas only produce lower amplitude noise. The present invention continuously monitors the output of the head to detect when the output changes from signal to noise and from noise back to signal.

Figure 3:
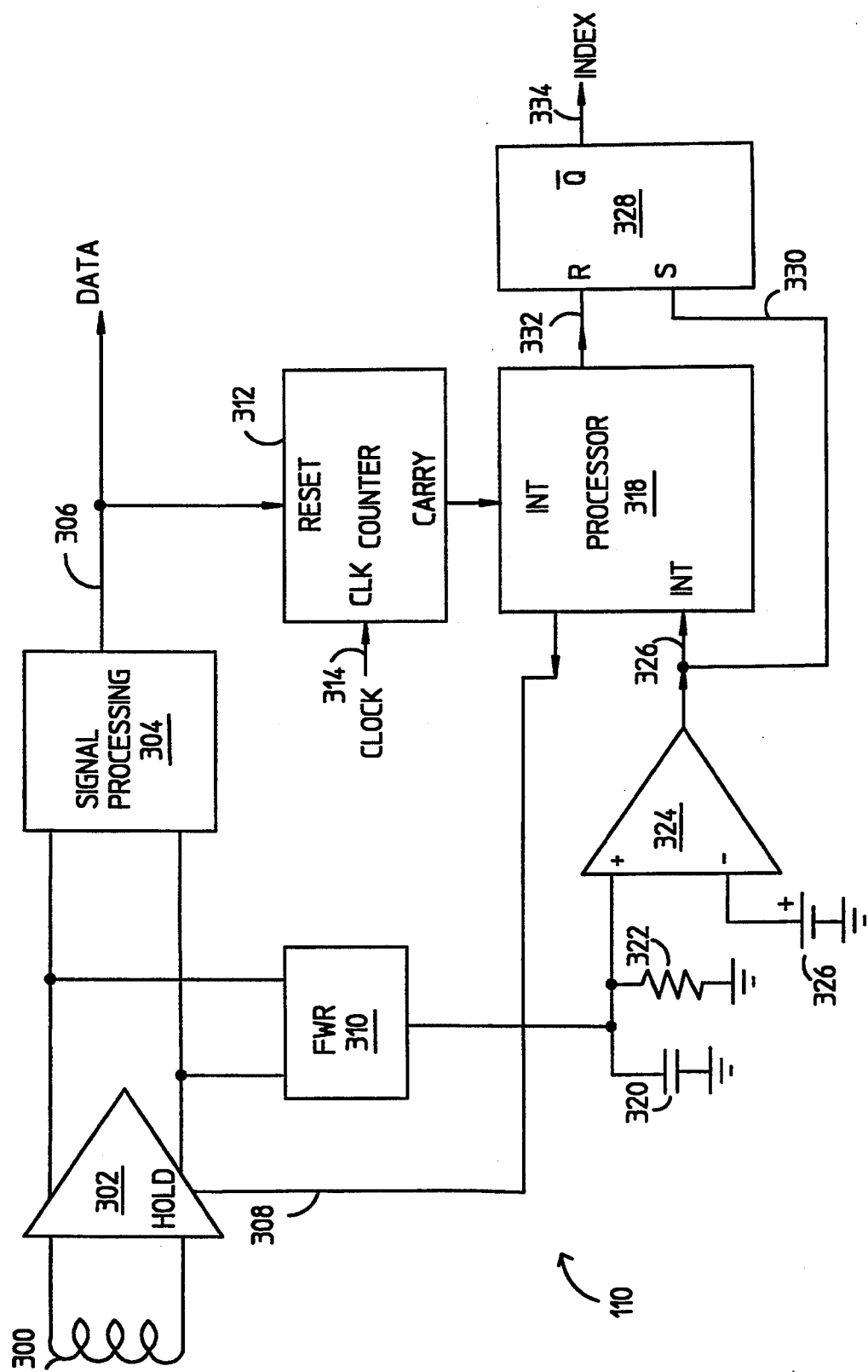
FIG. 3 is a block diagram schematic of a tape drive controller incorporating the present invention.

FIG. 3 illustrates a simplified block diagram schematic of the tape drive controller 110 illustrated in FIG. 1. A signal from, a magnetic head 300 is amplified by amplifier 302. The analog outputs of analog amplifier 302 are processed by signal processing circuitry 304 resulting in digital encoded dam pulses 306. Amplifier 302 has two modes controlled by hold input 308. In the hold mode, the amplifier has an externally controlled fixed gain. In the non-hold mode, the amplifier has closed loop automatic gain control (AGC). The outputs of amplifier 302 also go to a full wave rectifier (FWR) 310.

Data pulses 306 go to the reset input of a gap detect counter 312. The period between clock inputs for the clock input 314 for gap detect counter 312 is equal to the bit cell period of data being transferred from the tape controller 110 to the flexible disk controller (FIG. 1, 104). Clock signal 314 increments the gap detect counter 312. The gap detect counter 312 has a carry output 316 which goes to an interrupt input on a microprocessor 318.

The output of the full wave rectifier 310 is filtered by capacitor 320 and resistor 322 to provide a peak detector. The peak detector is one input of an analog comparator 324. The second input of the analog comparator 324 is a reference voltage 326. The reference voltage 326 may be provided for example by a resistor divider from the power supply.

The first step in detecting the DC erased gaps between segments (FIG. 2, 206 and 210) is detecting when the signal turns to noise, resulting in a cessation of data pulses. In one embodiment of the present invention, the gap detect counter 312 is a 4-bit binary counter. If 16 clock pulses (314) occur without gap detect counter 312 being reset by data pulses 306 then gap detect counter 312 generates a carry output 316 which interrupts processor 318. This signifies that a time equivalent to 16 bit cells has transpired without any data pulses occurring.

When the processor 318 is interrupted by a carry signal 316 from gap detect counter 312, it places amplifier 302 into a hold mode with a fixed gain. This gain is calibrated to ensure that valid signals exceed a fixed threshold but noise peaks in the DC erased gaps (FIG. 2, 206 and 210) do not exceed that fixed threshold. In particular, with erased tape noise going into amplifier 302 at that fixed gain, the peak detector input to comparator 324 will not exceed the threshold determined by reference voltage 326.

When a signal reappears at the beginning of a segment, (FIG. 2, gap areas 224 and 234) then the filtered peak outputs of amplifier 302 exceed reference voltage 326 and the output of comparator 324 switches to logical TRUE. For proper operation, the INDEX PULSE should be generated within the first 8 data pulses (306) after an erased area. A tape drive compatible with the QIC specifications can transfer data at 1 million bits per second. For this transfer rate, the INDEX PULSE should be generated within 9 microseconds of the beginning of gap data (FIG. 2, 224 and 234). If the processor 318 is used to initiate the INDEX PULSE, there is a risk of delay. Therefore, it is preferable to initiate the INDEX PULSE directly. In the embodiment illustrated in FIG. 3, the binary output of the comparator 324 is used to directly initiate an INDEX PULSE without waiting for any action by the processor 318. The comparator 324 initiates the INDEX PULSE and the processor 318 times the pulse and shuts it off. In FIG. 3, this is implemented by use of a RS flip-flop 328 which has a SET input 330 connected to the output of comparator 324, a RESET input 332 controlled by the processor 318 and an inverted output 334 which is the INDEX signal 334 (the INDEX signal 334 is active low). Also, when interrupt 326 is serviced, processor 318 returns amplifier 302 to a closed loop AGC mode.

Figure 4:
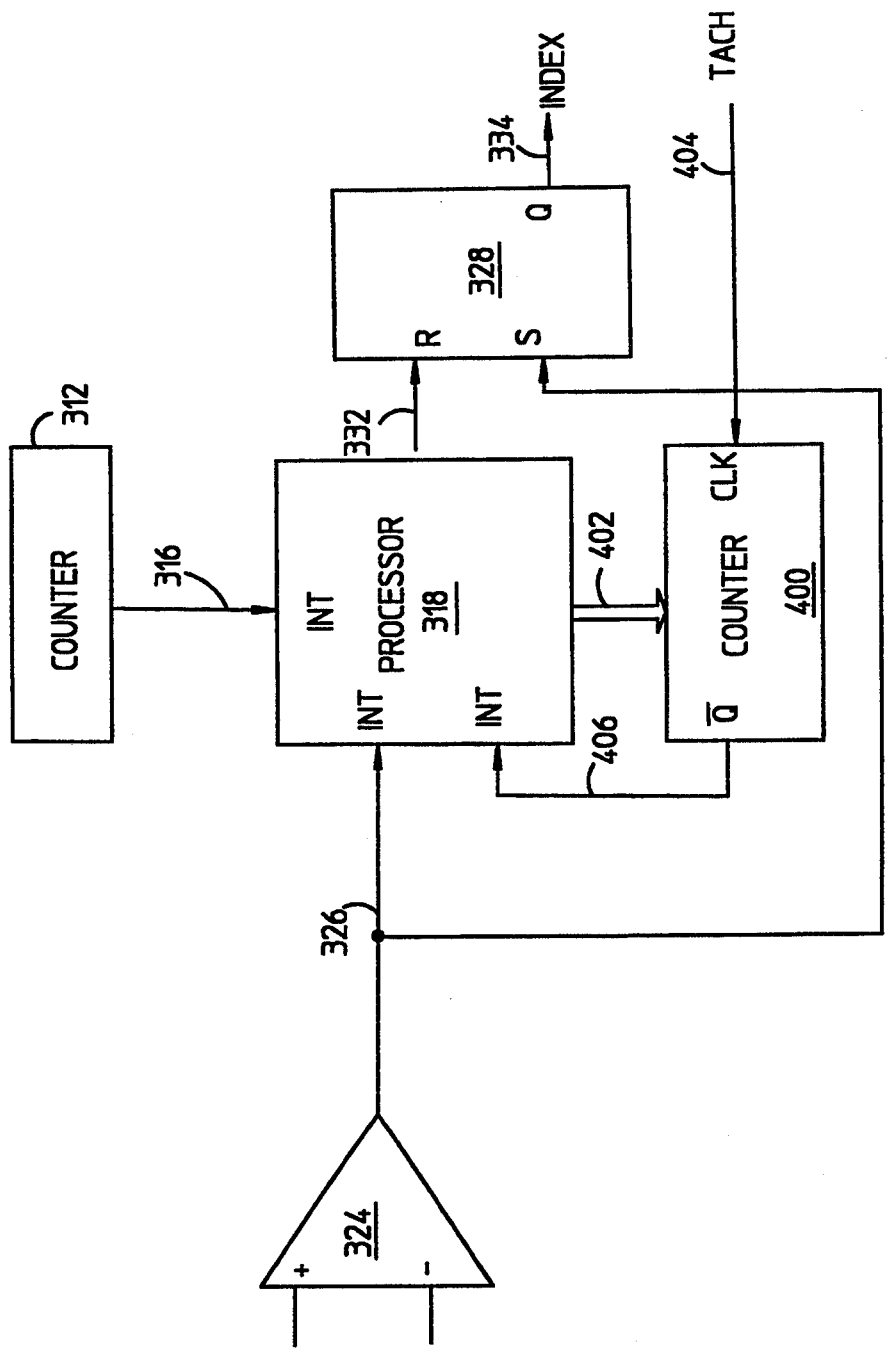
FIG. 4 is a block diagram partial schematic of an alternate embodiment of the present invention.

In FIG. 3, the peak detector filter (320, 322) and the reference voltage 326 operate to prevent false triggering from occasional noise spikes. However, it may be possible that some filtered noise will still exceed the reference voltage. To further ensure against a false signal resulting from high noise levels, the circuitry of FIG. 4 may be used. In FIG. 4, a distance counter 400 is used to suppress the output of comparator 324 for most of an erased area.

In FIG. 4, processor 318 loads distance counter 400 with an initial count value 402. The clock input for distance counter 400 is a tachometer (TACH) signal 404 from a motor control circuit (not illustrated). The TACH signal 404 is a tape drive motor commutation signal which is proportional to distance moved by the tape. That is, tape movement is directly proportional to motor revolutions and there are a fixed number of tach pulses per motor revolution. The TACH signal 404 decrements distance counter 400. The inverted output 406 of distance counter 400 provides a third interrupt to processor 318. When the distance counter 400 counts down to zero, processor 318 is interrupted.

When the processor 318 is interrupted by a carry signal 316 from the gap detect counter 312, it preloads distance counter 400 with a value N. N is a number corresponding to a length of tape which is slightly less than the worst case (shortest) length of an DC erased gap between segments (FIG. 2, 206 and 210) as represented by tape movement measured in motor tach pulses. For example, N may correspond to a length which is three-fourths of the shortest possible DC erased gap between segments (FIG. 2, 206 and 210). The response time of the peak detector filter (320, 322) is long enough to prevent intermittent noise peaks from building to a value at comparator 324 which exceeds the threshold during the remaining fraction.

Between the time that processor 318 is interrupted by the gap detect counter 312 and the time that processor 318 is interrupted by distance counter 400, the processor actively holds flip-flop 328 in a reset state. During that time interval, if the comparator 324 generates a false trigger, processor 318 prevents flop-flop 328 from generating an INDEX PULSE 334. After the interrupt 406 from distance counter 400, the processor enables the flip-flop 328 to be set by comparator 324. Then, as in FIG. 3, when the head encounters a gap pattern (FIG. 2, 224 and 234) at the beginning of a segment, the output of comparator 324 goes to logical TRUE and generates an INDEX PULSE 334 and interrupts processor 318. At that time, processor 318 returns amplifier 302 to a closed loop AGC mode and starts an internal timer to turn the INDEX PULSE 334 off.

The circuitry of FIG. 4 is also used to overcome still another potential noise problem. As illustrated in FIG. 2, there is a long erased area 214 between the end of a track and a physical end of tape marker 216. Again, there is a possibility that some filtered noise peaks will exceed the reference voltage (FIG. 3, 326) during the long erased area 214. Distance counter 400 is used to provide an additional measurement function to detect the erased area at the end of the track as follows. After the distance counter 400 counts down from a count of N and interrupts processor 318, processor 318 loads distance counter 400 with a new count M. M is a number such that N+M is slightly greater than the number corresponding to the longest length of a DC erased gap between segments (FIG. 2, 206 and 210) as represented by tape movement measured in motor TACH pulses. If comparator 324 generates an interrupt 326 before distance counter 400 generates an interrupt after a count of M, then an INDEX PULSE 334 is generated. However, if distance counter 400 generates an interrupt after a count of M and no INDEX PULSE 334 has been generated, then processor 318 suppresses generation of an INDEX PULSE 334 until the physical end of tape. Then, direction is reversed and the process is restatted for a new track.

Figure 5:
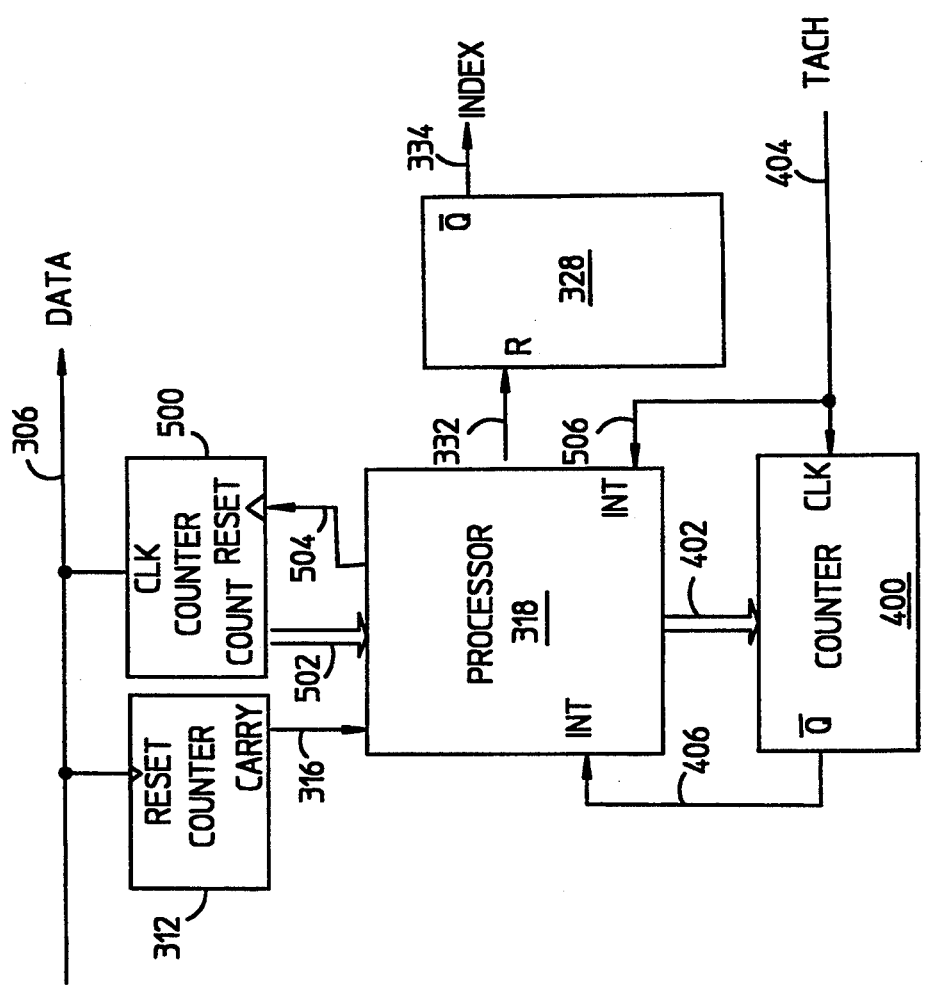
FIG. 5 is a block diagram partial schematic of an alternative embodiment of the present invention.

Referring back to FIG. 3, the analog filter circuitry (320 and 322) on the input to comparator 324 is designed to provide an average peak voltage and to prevent intermittent noise spikes from generating an INDEX PULSE 334. The threshold voltage 326 is designed such that when amplifier 302 is in a fixed gain mode then valid signal peaks should exceed the threshold voltage 326. Given the variability of analog signals from coil 300, it is possible that under some conditions, a valid analog data signal from coil 300 will result in data pulses 306 but the filtered peaks will not immediately exceed the threshold 326. In such a case, an INDEX PULSE 334 may not be generated within the specified first 8 data pulses (306) after the beginning of gap data (FIG. 2, 224 and 234). FIG. 5 illustrates additional circuitry designed to prevent the generation of an inappropriate INDEX PULSE 334 if data 306 is being generated and distance counter 400 (FIG. 4) has not completed counting M TACH pulses (FIG. 4, 404).

In FIG. 5, data 306, gap detect counter 312, carry signal 316, processor 318, flip flop 328, reset signal 332 and INDEX signal 334 are all identical to the corresponding items illustrated in FIG. 3. Likewise, distance counter 400, digital number 402 and TACH signal 404 are identical to the corresponding items illustrated in FIG. 4. FIG. 5 adds a data detect counter 500. Data detect counter 500 counts encoded digital data pulses 306. The digital output 502 is read by processor 318 and data detect counter 500 is reset by signal 504 from processor 318 each time the digital output 502 is read. Processor 318 has an additional interrupt 506 controlled by TACH signal 404. During the time that distance counter 400 is counting down from an initial value of M, at each interrupt 506 of a TACH pulse 404, processor 318 reads the digital count value 502 and then resets data detect counter 500. If the count value exceeds a value X, then processor 318 asserts reset signal 332 to suppress generation of an INDEX signal 334 by flip flop 328. The value X is typically 8 because the typical flexible disk controller specification requires an INDEX PULSE within the first 8 data pulses of a formatted gap. However, the value X may vary depending on the specific flexible disk controller specification for when the INDEX PULSE must occur.

In an embodiment of the present invention, counters 312, 400 and 500 and flip-flop 328 (all FIG. 5) are all implemented in an Applications Specific Integrated Circuit (ASIC). This ASIC includes a control register which can be read by the processor 318 and written by the processor 318. Included in the control register are one-bit flags which enable/disable the counters and the flip-flop. Specifically, an AUTO INDEX FLAG enables and disables flip-flop 328 and a GAP DETECT FLAG enables and disables gap detect counter 312.

Figure 6:
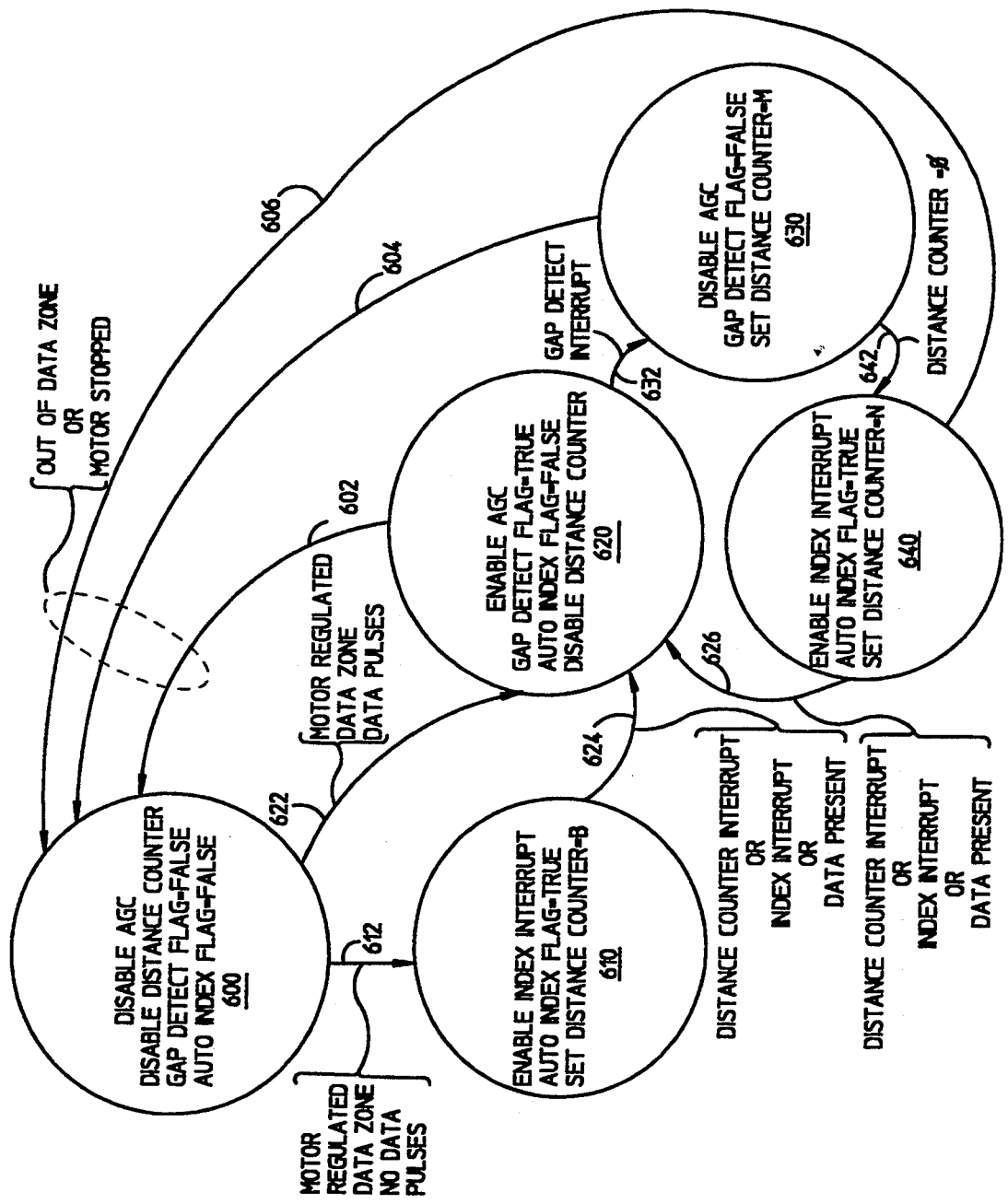
FIG. 6 is a state diagram illustrating the basic method of the present invention.
Figure 7:
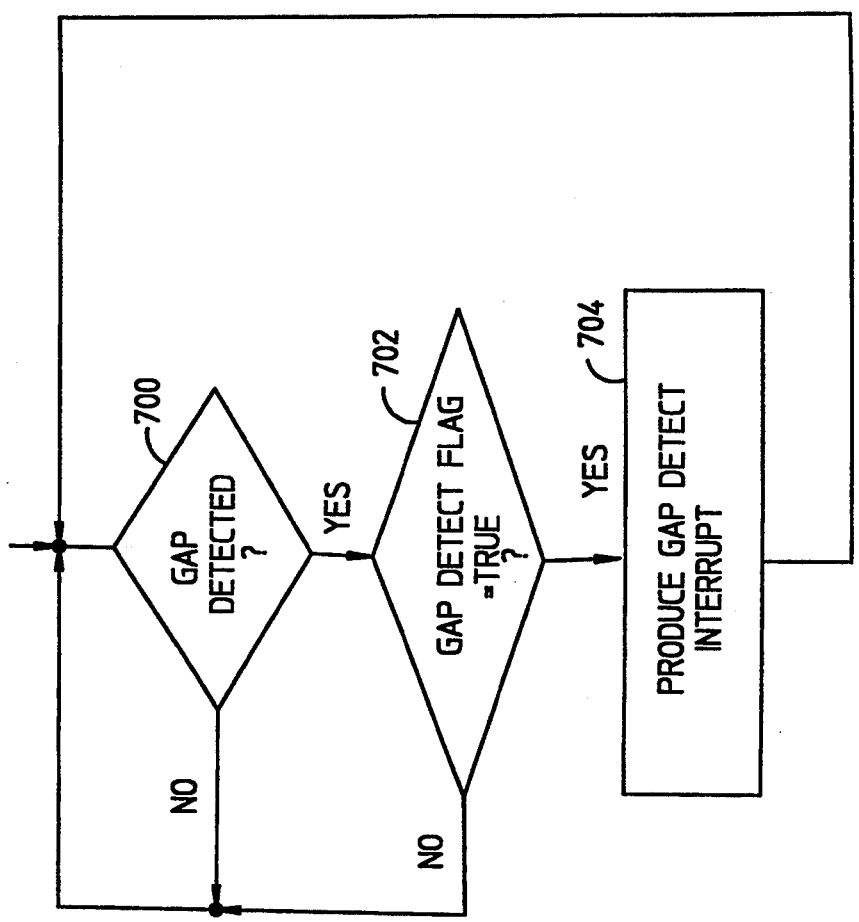
FIG. 7 is a flow chart illustrating the method of gap detection.
Figure 8:
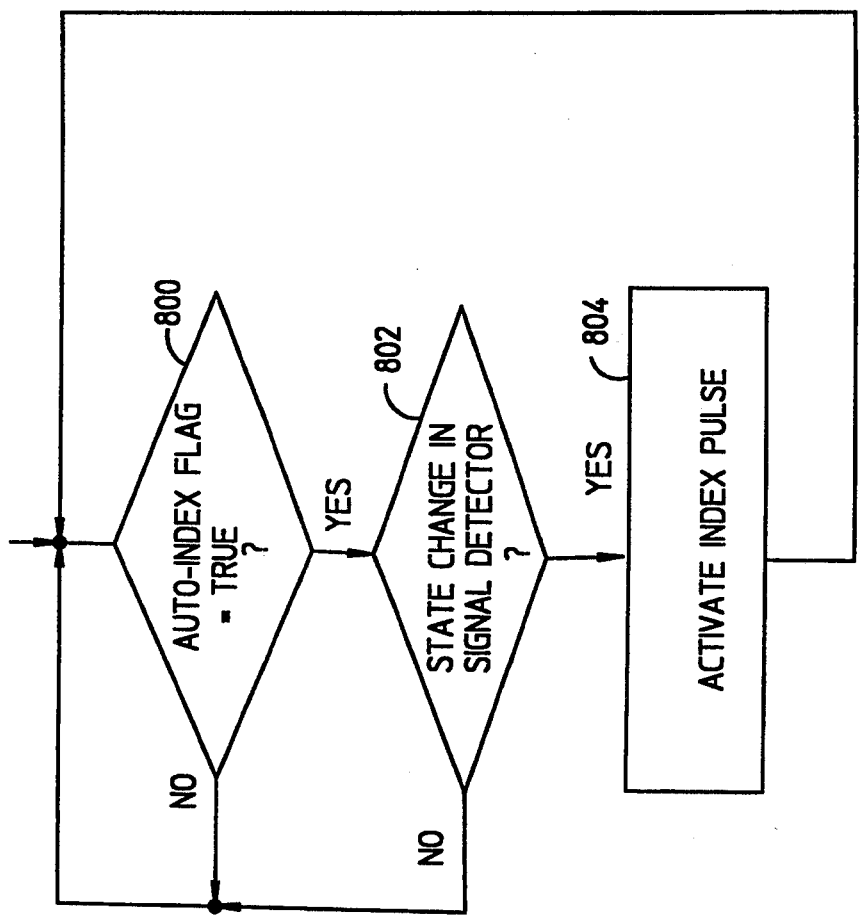
FIG. 8 is a flow chart illustrating the method of index pulse generation.

FIGS. 6-8 illustrate the basic method of the present invention in three interrelated diagrams. FIG. 6 illustrates states within the microprocessor (FIG. 5, 318). FIG. 7 illustrates the method of gap detection (FIG. 5, 312) as a flow chart. FIG. 8 illustrates the method of index generation (FIG. 5, 328) as a flow chart. The methods of distance measuring (FIG. 5, 400) and data detection (FIG. 5, 500) are not explicitly illustrated as separate state diagrams or flow charts but the results of the methods are reflected in states in FIG. 6. As discussed above, in FIG. 5, counter 312 and flip-flop 328 are controlled by the processor 318 by the use of one-bit flags. The states of these flags are determined within various processor states illustrated in FIG. 6 and the results of the flags are illustrated in FIGS. 7 and 8.

In FIG. 6, when the drive motor is stopped or if the drive motor has started but has not reached a regulated speed, the processor is in state 600. In state 600, AGC for amplifier 302 is disabled, the gap detect counter 312 is disabled (GAP DETECT FLAG=FALSE) and the flip-flop 328 is disabled (AUTO INDEX FLAG=FALSE). When the drive motor is started and has reached a regulated speed, then the state switches to state 610 via path 612 if no data pulses are being read or the state switches to state 620 via path 622 if data pulses are present.

At state 610, tape motion has started in an area without data. It may be in an erased gap between segments or it may be at the end of the tape. At state 610, flip-flop 328 is enabled so that if data appears, an INDEX PULSE will be generated. If an INDEX PULSE is generated, the state switches to state 620 via path 624. Also, distance counter 400 is initialized to a value of B (FIGS. 4 and 5, 402) where B is the worst case (maximum) erased distance between segments as measured by motor TACH pulses. At state 610, the distance counter 400 is used to ensure that AGC is enabled and the processor is ready to receive data (state switches to state 620) even if an INDEX PULSE is not generated. Likewise, if data detect counter 500 detects the presence of data, the state is switched to state 620 even if no INDEX PULSE has been generated.

At state 620, the processor is receiving data or is ready to receive data. In either case, AGC is enabled, INDEX PULSE generation is suppressed (AUTO INDEX FLAG=FALSE), the gap detect counter 312 is enabled (GAP DETECT FLAG=TRUE), and the distance counter 400 is disabled. If an interrupt from the gap detect counter 312 indicates that a gap is present, the state switches to state 630 via path 632.

At state 630, a gap has been detected and distance counter 400 is used to suppress generation of an INDEX PULSE for some fraction of a gap distance (M TACH pulses). At state 630 the AGC is disabled so that comparator 324 (FIG. 3) can distinguish signal from noise. In addition, the gap detect counter 312 is disabled (GAP DETECT FLAG=FALSE).

At state 640, the tape has moved a distance corresponding to M TACH pulses and INDEX PULSE generation is enabled (AUTO INDEX FLAG=TRUE). If an INDEX PULSE is generated, the state switches to state 620 via path 626. At state 640, distance counter 400 is used to ensure that if no INDEX PULSE has occurred within a distance corresponding to N TACH pulses, then the state is switched to state 620 even if no INDEX PULSE is generated. Likewise, if data detect counter 500 detects the start of data, then the state is switched to state 620 even if no INDEX PULSE is generated.

If the motor is stopped while the processor is in states 620, 630 or 640, the state returns to state 600 (paths 602, 604 and 606). Alternatively, if the end of the tape is reached, the state returns to state 600.

As illustrated in FIG. 7, if a gap is detected (700), an interrupt is generated (704) only if the GAP DETECT FLAG=TRUE (702). As illustrated in FIG. 8, a change in state of the signal detector (802) triggers an INDEX PULSE (804) only if the AUTO INDEX FLAG=TRUE (800).

From the above description, it can be seen that the present invention provides an INDEX PULSE immediately after the beginning of a segment. In addition, the present invention reduces the impact of noise by inhibiting generation of an INDEX PULSE outside a narrow window of tape movement distance before and after a possible beginning of a segment.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a tape drive having a tape with data areas separated by erased areas, wherein each data area has a beginning, wherein there is an analog signal from the tape which stops in each erased area and restarts at the beginning of each data area, and wherein the analog signal is amplified by an amplifier to provide an amplified analog signal and is then converted by a signal processor to a digitally encoded data signal, an apparatus for generating a pulse at the beginning of each data area, the apparatus comprising:

timer means, which receives the digitally encoded data signal and which has a timer output, for determining when the digitally encoded data signal has stopped;

monitor means, which receives the amplified analog signal and which has a monitor output, for continuously determining when the amplified analog signal has restarted; and pulse generating means, connected to the monitor output and to the timer output, for generating the pulse instantaneously whenever the monitor output indicates that the amplified analog signal has restarted after the timer output has indicated that the digitally encoded data signal has stopped.

2. The apparatus for generating a pulse as in claim 1, wherein each erased area has a length which is greater than a minimum erased length, the apparatus further comprising:
  a movement signal from the tape drive indicating length moved by the tape;
  length measurement means, receiving the movement signal and having a length measurement output, for measuring length of movement of the tape; and
  pulse suppression means, having a first output connected to the pulse generating means, a first input connected to the output of the timer means and a second input connected to the length measurement output, for suppressing generation of the pulse by the pulse generating means from the time the timer means indicates the digitally encoded signal has stopped until the length measurement means indicates the tape has moved the minimum erased length.

3. The apparatus for generating a pulse as in claim 2 wherein the amplifier has an automatic gain control mode and a fixed gain mode and wherein the amplifier has a mode control input which controls whether the amplifier is in the automatic gain control mode or the fixed gain mode, the apparatus further comprising:
  gain control means, having a first input connected to the output of the timer means and a second input connected to the length measurement output and having an output connected to the amplifier mode control input, for setting the amplifier mode to the fixed gain mode when the timer means indicates the digitally encoded data signal has stopped and for setting the amplifier mode to the automatic gain control mode when the monitor output indicates that the amplified analog signal has restarted.

4. The apparatus for generating a pulse as in claim 2, wherein each erased area has a length which is less than a maximum erased length, and wherein the pulse suppression means suppresses generation of the pulse if the tape has moved more than the maximum erased length.

5. The apparatus for generating a pulse as in claim 4 wherein the amplifier has an automatic gain control mode and a fixed gain mode and wherein the amplifier has a mode control input which controls whether the amplifier is in the automatic gain control mode or the fixed gain mode, the apparatus further comprising:
  gain control means, having a first input connected to the output of the timer means and a second input connected to the length measurement output and having an output connected to the amplifier mode control input, for setting the amplifier mode to the fixed gain mode when the timer means indicates the digitally encoded data signal has stopped and for setting the amplifier mode to the automatic gain control mode when the monitor output indicates that the amplified analog signal has restarted.

6. The apparatus for generating a pulse in claim 1 wherein the amplifier has an automatic gain control mode and a fixed gain mode and wherein the amplifier has a mode control input which controls whether the amplifier is in the automatic gain control mode or the fixed gain mode, the apparatus further comprising:
  gain control means, having a first input connected to the output of the timer means and a second input connected to the length measurement output and having an output connected to the amplifier mode control input, for setting the amplifier mode to the fixed gain mode when the timer means indicates the digitally encoded data signal has stopped and for setting the amplifier mode to the automatic gain control mode when the monitor output indicates that the amplified analog signal has restarted.

7. In a tape drive having a tape with data areas separated by erased areas, wherein each data area has a beginning, wherein there is an analog signal from the tape which stops in each erased area and restarts at the beginning of each data area, and wherein the analog signal is amplified by an amplifier to provide an amplified analog signal and wherein the amplified analog signal is converted by a signal processor to a digitally encoded data signal comprising data bits, a method for generating a pulse at the beginning of each data area, the method comprising the following steps:
  A. monitoring the digitally encoded data signal to determine when the digitally encoded data signal stops;
  B. monitoring the amplified analog signal continuously to determine when the amplified analog signal starts; and
  C. generating the pulse immediately when the amplified analog signal starts after the digitally encoded data signal has stopped.

8. The method for generating a pulse as in claim 7, wherein each erased area has a length which is greater than a minimum erased length, the method further comprising the following step after step A:
  A1. monitoring the distance moved by the tape;
  wherein step C is performed only if the tape has moved the minimum erased length.

9. The method for generating a pulse as in claim 8 wherein the amplifier has an automatic gain control mode and a fixed gain mode and wherein the amplifier has a mode control input which controls whether the amplifier is in the automatic gain control mode or the fixed gain mode, the method further comprising the following step after step A and before step A1:
  A'. setting the amplifier to the fixed gain mode when the digitally encoded data signal has stopped;
  and further comprising the following step after step B;
  B'. setting the amplifier to the automatic gain control mode when the amplified analog signal starts after the digitally encoded data signal has stopped.

10. The method for generating a pulse as in claim 7 wherein the amplifier has an automatic gain control mode and a fixed gain mode and wherein the amplifier has a mode control input which controls whether the amplifier is in the automatic gain control mode or the fixed gain mode, the method further comprising the following step after step A:
  A'. setting the amplifier to the fixed gain mode when the digitally encoded data signal has stopped;
  and further comprising the following step after step B;
  B'. setting the amplifier to the automatic gain control mode when the amplified analog signal starts after the digitally encoded data signal has stopped.

11. The method for generating a pulse as in claim 8, wherein each erased area has a length which is less than a maximum erased length, the method further comprising:
  wherein step C is suppressed if the tape is moved the maximum length of the erased areas.

12. The method for generating a pulse as in claim 11 further comprising the following step after A1:

A2. reading the digitally encoded data at the beginning of each data area;

wherein step C is suppressed if the number of data bits of digitally encoded data read from the beginning of each data area exceeds a predetermined number of bits.

13. The method for generating a pulse as in claim 12 wherein the amplifier has an automatic gain control mode and a fixed gain mode and wherein the amplifier has a mode control input which controls whether the amplifier is in the automatic gain control mode or the fixed gain mode, the method further comprising the following step after step A and before step A1:

A'. setting the amplifier to the fixed gain mode when the digitally encoded data signal has stopped;

and further comprising the following step after step B;

B'. setting the amplifier to the automatic gain control mode when the amplified analog signal starts after the digitally encoded data signal has stopped.

14. The method for generating a pulse as in claim 11 wherein the amplifier has an automatic gain control mode and a fixed gain mode and wherein the amplifier has a mode control input which controls whether the amplifier is in the automatic gain control mode or the fixed gain mode, the method further comprising the following step after step A and before step A1:

A'. setting the amplifier to the fixed gain mode when the digitally encoded data signal has stopped;

and further comprising the following step after step B;

B'. setting the amplifier to the automatic gain control mode when the amplified analog signal starts after the digitally encoded data signal has stopped.

* * * * *